United States Patent [19]

Lee

[11] Patent Number: 4,968,757
[45] Date of Patent: Nov. 6, 1990

[54] SOLUBLE SILICONE-IMIDE COPOLYMERS

[75] Inventor: Chung J. Lee, Ballston Lake, N.Y.

[73] Assignee: MicroSi, Inc., Phoenix, Ariz.

[21] Appl. No.: 13,999

[22] Filed: Feb. 6, 1987

Related U.S. Application Data

[60] Division of Ser. No. 805,156, Dec. 4, 1985, Pat. No. 4,670,497, which is a continuation of Ser. No. 662,930, Oct. 19, 1984, Pat. No. 4,586,997.

[51] Int. Cl.$^5$ ............................................. C08G 77/04
[52] U.S. Cl. ..................................... 525/426; 525/431; 525/474; 525/479; 528/26; 528/172; 528/185; 528/188; 427/387; 428/447; 428/473.5
[58] Field of Search ......................... 525/431; 528/26

[56] References Cited

U.S. PATENT DOCUMENTS

| | | | |
|---|---|---|---|
| 3,325,450 | 6/1967 | Holub | 528/170 |
| 4,030,948 | 6/1977 | Berger | 528/38 |
| 4,140,572 | 2/1979 | Stein | 427/336 |
| 4,331,799 | 5/1982 | Holub et al. | 528/188 |
| 4,395,527 | 6/1983 | Berger | 528/38 |
| 4,586,997 | 5/1986 | Lee | 525/426 |
| 4,670,497 | 1/1987 | Lee | 524/377 |

Primary Examiner—Harold D. Anderson
Assistant Examiner—Frederick Krass
Attorney, Agent, or Firm—Thomas E. Spath

[57] ABSTRACT

There is provided a siloxane-imide copolymer composition having at least one polymeric block with a low glass transition temperature and at least one polymeric block with a high glass transition temperature. Preferred compositions have the general formula

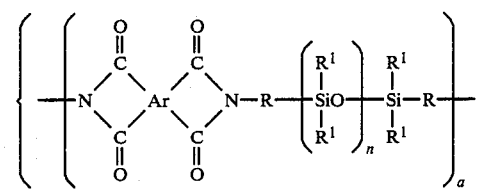

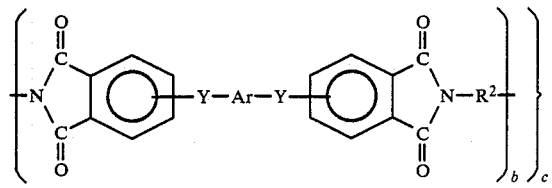

12 Claims, No Drawings

SOLUBLE SILICONE-IMIDE COPOLYMERS

CROSS REFERENCE TO RELATED APPLICATIONS

This application is a division of U.S. application Ser. No. 805,156, filed Dec. 4, 1985, now U.S. Pat. No. 4,670,497, which in turn was a continuation of U.S. application Ser. No. 662,930, filed Oct. 19, 1984, now U.S. Pat. No. 4,586,997.

BACKGROUND OF THE INVENTION

The present invention relates to polymeric compositions having both siloxane units and imide units. More particularly, the present invention relates to siloxane-imide copolymers which are soluble in diglyme; i.e. diglycol methyl ethers.

It is known in the art that siloxane-imide copolymers can be prepared by reacting, for example, a diaminosiloxane and a dianhydride such as benzophenone dianhydride to yield a polyamide acid having the formula

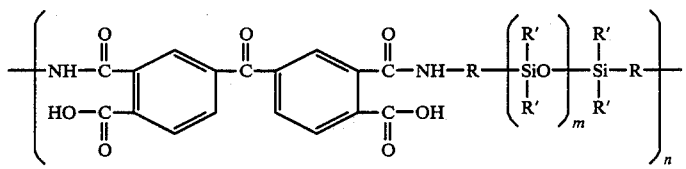

where R is a divalent hydrocarbon radical, R' is a monovalent hydrocarbon radical, m is a whole number greater than one, and n is a whole number greater than 10. Such polyamide acids are soluble in highly polar solvents such as N-methyl pyrrolidone and are provided the end-user in this form.

The siloxane-imide polymer is formed, typically after the end-user has applied a coating of polyamide acid to a substrate, by heating at a temperature of from about 150° C. to about 400° C. to remove the solvent and effect cyclization to form a siloxane-imide copolymer having, for example, the formula

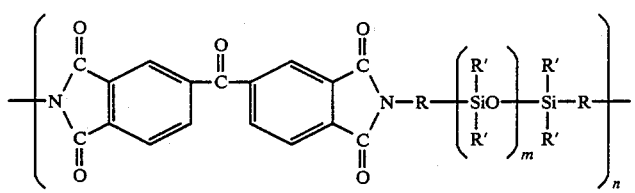

These polyimides, while useful as protective coatings for semiconductors and other electronic devices, suffer from the defect that they are insoluble in virtually all of the common organic solvents. Another drawback of methods which require heating the polyamide acid at temperatures of from 150° C. to 400° C. is that many semiconductor devices cannot be heated to such extremes without adversely affecting the device itself. Furthermore, the artisan will appreciate that the amide acid can hydrolyze to form carboxylic acid groups which, of course, will prevent complete imidization when the end-user attempts to use the product. Accordingly, it is desirable to provide a polyimide capable of being applied in the form of an imide rather than in the form of an amide acid.

Holub, U.S. Pat. No. 3,325,450, discloses polyimidesiloxanes of Formula II hereinabove and their preparation by reacting diaminosiloxanes and organic dianhydrides to form a polyamide acid, and thereafter heating the polyamide acid to effect imidization. Variations of Holub's teachings can be found in U.S. Pat. Nos. 3,392,144; 3,435,002; 3,553,282; 3,558,741; 3,663,728; and 3,740,305.

Berger, U.S. Pat. No. 4,030,948, discloses a polyimide copolymer which is the reaction product of a tetracarboxylic acid dianhydride, an organic diamine and a di(aminoalkyl)polysiloxane, where the di(aminoalkyl)-polysiloxane constitutes 18 to 45 mole percent of the total amine requirement of the polymer.

Berger, U.S. Pat. No. 4,395,527, discloses that polyimides containing siloxane units of the formula

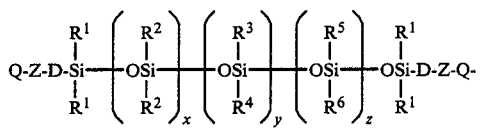

(I)

where Q is a substituted or unsubstituted aromatic group; Z is —O—, —S—,

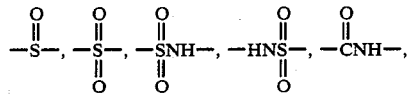

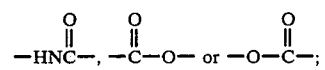

(II)

D is an unsubstituted or substituted hydrocarbylene; $R^1$, $R^2$, $R^3$, $R^4$, $R^5$, and $R^6$ are each, independently, unsubstituted or substituted hydrocarbyl radicals; and x, y and z each, independently, have a value from 0 to 100; impart improved solubility and adhesion to the polyimide. Generally, such polyimides are said to be soluble in chlorinated hydrocarbon solvents such as dichlorobenzene and trichlorobenzene, as well as in polar solvents such as N,N-dimethyl acetamide; N-methyl caprolactam; dimethylsulfoxide; N-methyl-2-pyrrolidone; tetramethylurea; pyridine; dimethylsulfone; hexamethylphosphoramide; tetramethylene sulfone; formamide; N-methylforamide; butyrolactone; and N-acetyl-2-pyrrolidone. Berger further teaches that if a diether-containing anhydride is utilized as one of the starting materials, there is obtained a polyimide soluble not only in the chlorinated hydrocarbon solvents and polar solvents previously disclosed, but also, where it contains a siloxane unit, the polyimide is soluble in a solvent which is derived from monoalkyl and/or dialkyl ethers of ethylene glycol and condensed polyethylene glycols and/or cyclic ethers containing no less than a five member ring, such as diglyme. However, Berger makes clear that polyimides will have limited solubility in diglyme. The artisan will appreciate that Berger requires the use of unusual monomers which, accordingly, are rather expensive if it is desired to obtain a diglyme soluble imide-siloxane polymer. In another aspect Berger teaches the art that polyimides containing siloxane units have a much lower glass transition temperature (Tg), e.g. on the order of 140° C. as compared with 350° C. for conventional polyimides. Consequently, they will melt and flow more readily than prior art polyimides.

SUMMARY OF THE INVENTION

It is one object of the present invention to provide diglyme soluble siloxane-imide copolymers that are not prepared from unusual and expensive materials.

It is another object of the present invention to provide siloxane-imide copolymers with two glass transition temperatures so as to provide compositions with a broader useful working range than siloxane-imide copolymers and organic imide polymers of the prior art.

Other objects and advantages will be obvious to the artisan from the following description of the invention and the appended claims.

In its broadest aspect the instant invention comprises a diglyme soluble siloxane-imide copolymer having at least one polymeric block with a low glass transition temperature and at least one polymeric block with a high glass transition temperature.

Preferably the diglyme soluble siloxane-imide copolymer has the general formula

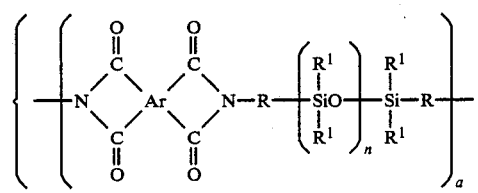

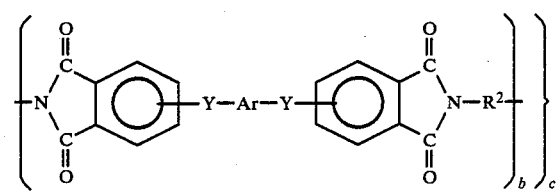

where each Ar is an independently selected aromatic radical; R is a substituted or unsubstituted hydrocarbylene radical or a radical of the formula $-Q-Z-R^3-$, where Q is a substituted or unsubstituted aromatic group, Z is $-O-$, $-S-$,

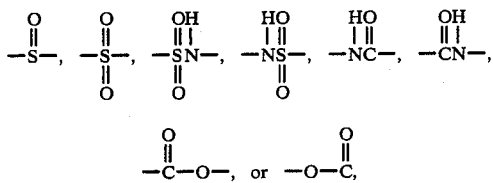

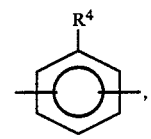

and $R^3$ is a substituted or unsubstituted hydrocarbylene; each $R^1$ is an independently selected substituted or unsubstituted hydrocarbyl radical; $R^2$ is a radical selected from the group consisting of

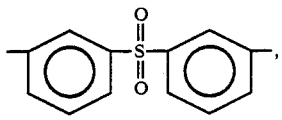

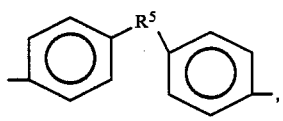

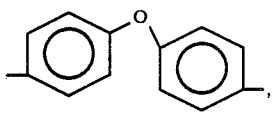

and

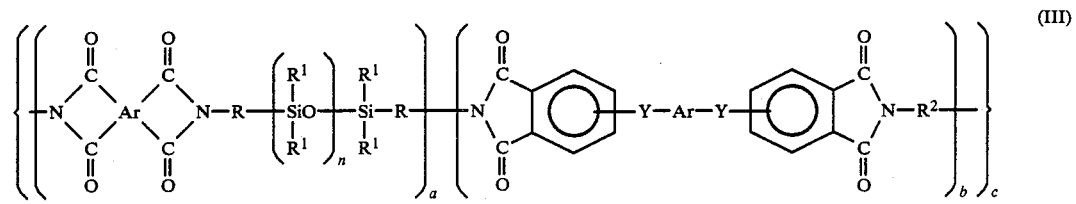

where $R^4$ is an alkyl radical having from 1 to 9 carbon atoms and $R^5$ is an alkyl radical having from 1 to 4 carbon atoms; Y is oxygen or sulfur, and a, b, c and n are all integers equal to or greater than 1.

DESCRIPTION OF THE INVENTION

In accordance with the present invention there is provided diglyme soluble siloxane-imide copolymers having at least one polymeric block with a low glass transition temperature ($Tg_1$) and at least one polymeric block with a high glass transition temperature ($Tg_2$).

Generally the diglyme soluble siloxane-imide copolymers of the present invention have the general formula (III)

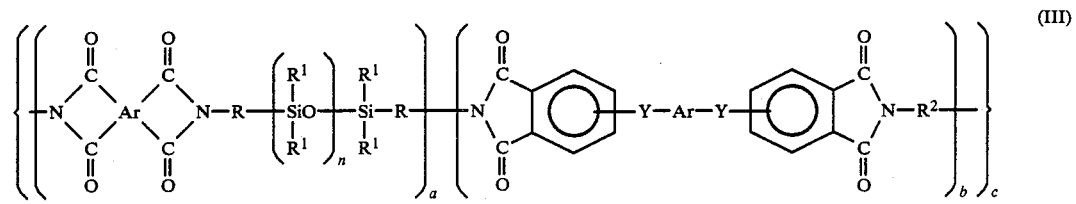

where each Ar is an independently aromatic radical; R is a substituted or unsubstituted hydrocarbylene radical or a radical of the formula —Q—Z—R³—, where Q is a substituted or unsubstituted aromatic group; Z is —O—, —S—,

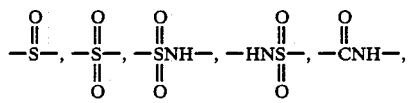

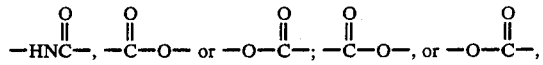

and R³ is a substituted or unsubstituted hydrocarbylene; each R¹ is an independently selected substituted or unsubstituted hydrocarbyl radical; R² is a radical selected from the group consisting of

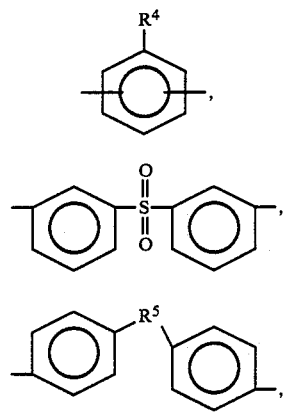

and

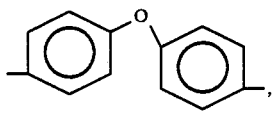

where R⁴ is an alkyl radical having from 1 to 9 carbon atoms and R⁵ is an alkyl radical having from 1 to 4 carbon atoms; Y is oxygen or sulfur, and a, b, c and n are all integers equal to or greater than 1.

Siloxane-imide polymeric units of the formula

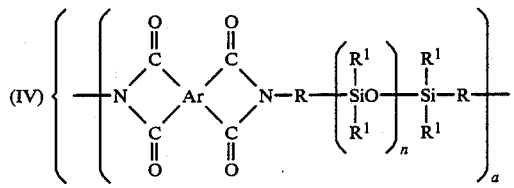

impart to the copolymers of the instant invention blocks having a low glass transition temperature, preferably from about −110° to about 0° C. Moreover, due to the presence of the diorganosiloxy units, a degree of softness or flexibility can also be imparted to the final product; e.g. elasticity at low temperatures.

The preparation of such polymers is well known in the art, for example, according to the teachings of U.S. Pat. Nos. 3,325,450 and 4,395,527, both of which are incorporated by reference into the instant disclosure.

Generally, polyimides are prepared by reacting a dianhydride with a diamine, and more particularly in the present invention, with a diamino terminated polydiorganosiloxane to form a polyamide acid, and thereafter heating the polyamide acid to effect cyclyzation.

Ar in the above formula IV can be a tetravalent benzene or naphthalene nucleus or a tetravalent group of the formula

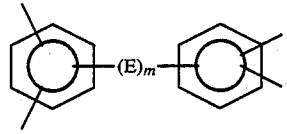

where m is 0 or 1 and E is —O—, —S—,

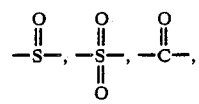

or —C$_y$H$_{2y}$—, where y is an integer from 1 to 8.

In a more preferred embodiment Ar of formula IV includes diether linkages so as to increase the solubility of the final product in diglyme. Thus, in the more preferred embodiment, Ar of formula IV is a tetravalent residue of the formula

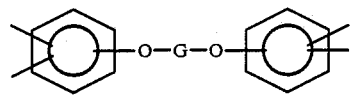

where G is phenylene or a group of the formula

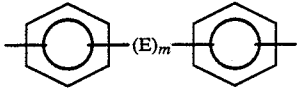

where E and m are as previously defined.

Especially preferred is an Ar group in formula IV having the formula

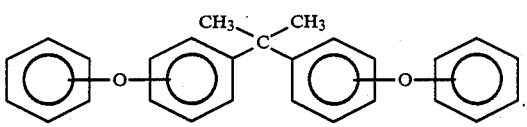

A more complete listing of suitable Ar radicals and the corresponding dianhydride reactant can be found in U.S. Pat. No. 4,395,527.

R can be any substituted or unsubstituted hydrocarbylene radical, for example, a linear or branched alkylene radical having up to about 20 carbon atoms such as methylene, ethylene, propylene, isopropylene, isobutylene; an alkylene radical having up to about 20 carbon atoms which is interrupted in the chain by one or more phenylene radicals; or a radical of the formula —Q—Z—R³—, where Q is any substituted or unsubstituted aromatic hydrocarbylene radical such as phenylene or naphthalene, or a heterocyclic aromatic radical where the hetero atom is selected from N, O and S; Z is —O—, —S—,

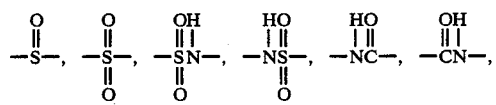

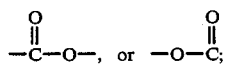

and $R^3$ is a hydrocarbylene radical within the scope of R. Preferably R is a lower alkylene radical and most preferably is propylene. These and other suitable R groups are known in the art and are described more fully in U.S. Pat. Nos. 3,325,450 and 4,395,527.

$R^1$ radicals can be any independently selected monovalent substituted or unsubstituted radicals typically bonded to silicon atoms of a polysiloxane. Among the more preferred $R^1$ radicals are lower alkyl radicals such as methyl, ethyl, propyl or butyl radicals, phenyl radicals, vinyl radicals, 3,3,3-trifluoropropyl radicals and the like. Depending upon the desired properties of the final product, the artisan can select suitable $R^1$ radicals, as well as all the other radicals, in proper ratios without undue experimentation.

In the foregoing formulas III and IV, a can be any integer equal to or greater than 1 and preferably is greater than 10, and n can be any integer greater than 1 and preferably is from 5 to about 100.

In addition to the foregoing polymeric units described by formula IV, the present invention requires that there also be present at least one block of organic polyimide units of the formula

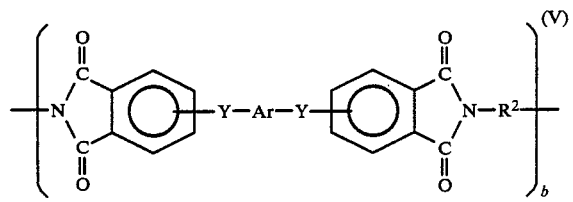

which imparts to the copolymers of the instant invention blocks having a high glass transition temperature, typically from about 100° to 300° C., and preferably from 150° C. to 300° C.

The artisan will appreciate that such units will impart to the final product thermoplastic properties. Thus, the novel compositions of the present invention can best be described as "thermoplastic elastomers".

Ar in formula V can be any divalent aromatic radical and preferably is somewhat narrower than the Ar radical of formula IV. That is,

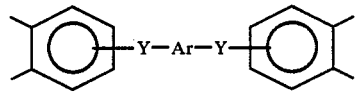

of formula V can be considered to be a subgroup of Ar of formula IV in that it requires the aromatic radical to be divalently bonded to a phenyl radical through Y, which is an oxygen or sulfur atom, and preferably is an oxygen atom. Suitable Ar radicals in formula V are easily ascertainable by the skilled artisan.

Critical to providing diglyme soluble siloxane-imide copolymers in accordance with the present invention is that $R^2$ can only be a radical selected from the group consisting of

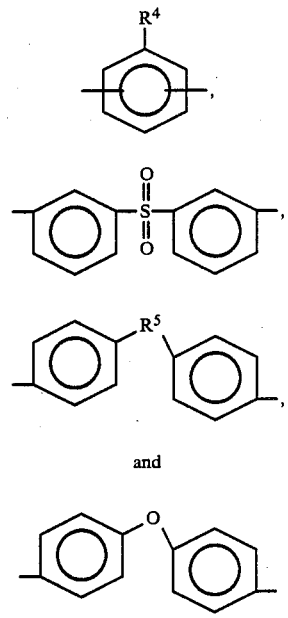

and where $R^4$ is an alkyl radical having from 1 to 9 carbon atoms, preferably 1 to 3 carbon atoms and most preferably is methyl, $R^5$ is an alkylene radical having from 1 to 4 carbon atoms, preferably 1 or 2 carbon atoms and most preferably is methylene.

In formula V, b can be any integer equal to or greater than 1 and preferably is greater than 10.

In a particularly preferred embodiment of the present invention, the organic polyimide portion of formula IV structural units is the same as the structural units of formula V. This enables the artisan to copolymerize the composition of the instant invention in a single step without having to first form intermediate polymers of formulas IV and V. For example, if the intermediate polymer of formula IV is prepared by reacting a dianhydride of the formula

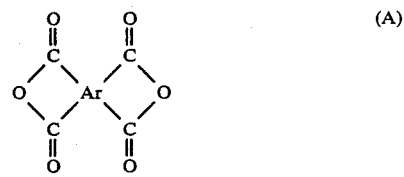

with a amino-terminated siloxane of the formula

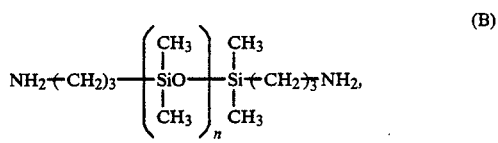

and the intermediate polymer of formula V is prepared by reacting

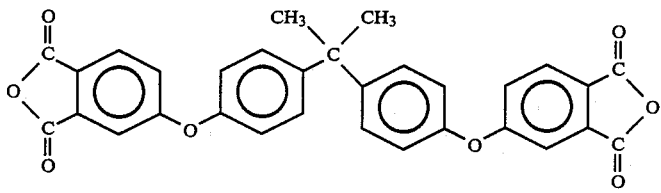

(C)

with a diamine of the formula, for example,

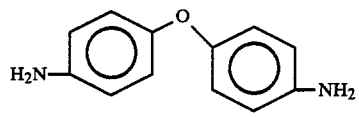

(D)

In the case where Ar of the reactant (A) has the formula

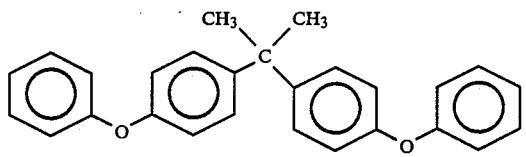

it is identical with reactant (C). It has been found that the reaction between reactants (C) and (D) is extremely fast in comparison with the reaction between reactants (A) and (B). Accordingly, only organic polyamide acid blocks are formed until all of reactant (D) is used up, then acidamide-siloxane blocks are formed from the remaining dianhydride (i.e. A and C) and the aminosiloxane.

If, however, reactants (A) and (C) are not the same, in order to obtain block copolymers it is necessary to first form the intermediate polymers of formulas (4) and (5) by methods known in the art. Once these intermediate polymers are formed they are polymerized with one another to form the compositions of the present invention. Other methods for making the copolymers of the present invention will be obvious to the artisan.

The compositions described hereinabove find special utility in the field of protective coatings for semiconductors, electronic devices and the like. While it would be expected that the copolymers of the instant invention would merely provide glass transition temperatures intermediate prior art organic polyimides and siloxane-imides, and hence a useful working range intermediate such prior art compositions, quite unexpectedly, the combination of such prior art polyimides which comprise the instant invention results in compositions which can be considered to have two distinct glass transition temperatures. Consequently there is provided by the present invention novel copolymers which are useful over a much broader temperature range than would be expected from the teaching of the prior art.

In another aspect of the present invention, and as a result of the diglyme solubility of the compositions disclosed herein, it is possible to prepare compositions useful in the preparation of photoresists.

In the copending applications of W. D. Kray, Ser. No. 573,883 now abandoned filed Jan. 24, 1984, and G. Davis, now U.S. Pat. No. 4,515,887, both of which are assigned to the same assignee as the present invention, and incorporated herein by reference, disclose that photoresists can be prepared from photosensitive polyamide acid compositions of the formula

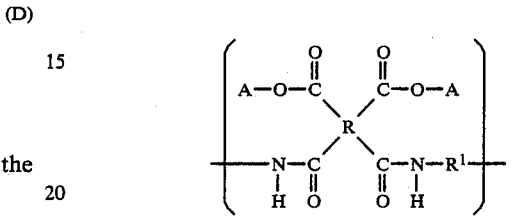

where R is a tetravalent organic radical or a tetravalent organosiloxane-containing radical, $R^1$ is a divalent organic radical or a divalent organosiloxane-containing radical, and A is a photoreactive acrylate, cinnamate or 2,3-diphenylcyclopropenol ester containing radical.

For example, Kray teaches the art that the polyamide acid is applied to a substrate such as a silicon wafer, the substrate is then masked and exposed to a light source so as to effect crosslinking in the unmasked areas, thereafter the exposed substrate is developed by exposing the photoresist to a solvent wherein the crosslinked polyamide is insoluble but the uncrosslinked polyamide acid is soluble, and finally the developed photoresist is heated at a temperature sufficient to convert the polyamide acid to a polyimide. For the reasons set forth hereinabove, it would be desirable to employ the diglyme soluble compositions of the present invention in the preparation of photoresists. This can readily be accomplished by bonding to one or more of the R groups of formula III a radical, for example, of the formula

which, after the composition of the invention is imidized, can be reacted with a photosensitive compound of the formula

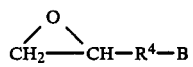

where $R^4$ is a divalent radical having from 1 to 8 carbon atoms and B is a photosensitive acrylate, cinnamate or 2,3-diphenylcyclopropenol ester containing group. There is thus provided a photosensitive polyimide composition rather than a photosensitive polyamide acid composition, which can be applied to a substrate such as a silicon wafer by conventional methods, the coated substrate covered with a mask so as to obtain the desired pattern before exposing the substrate to a suitable light source to effect crosslinking, and thereafter developing the exposed substrate by exposing it to a suitable solvent. As in the case of Kray, the uncrosslinked composition is soluble solvent whereas the crosslinked composition is not. The advantage of employing the compositions of the present invention which have photosensitive radicals bonded thereto is that it is no longer necessary to effect imidization by exposing the photoresist to an elevated temperature.

So that those skilled in the art can better understand the present invention the following examples are provided by way of illustration and not by way of limitation. All parts are by weight unless noted otherwise.

EXAMPLES

In the following examples the monomers employed to illustrate the practice of the present invention are as follows:

| SDA | 3,3'-sulfonyldianiline |
|---|---|
| BTDA | 3,3',4,4'-benzophenonetetracarboxylic acid dianhydride |
| TDA | 2,4-tolunedianiline |
| MDA | methylenedianiline |
| GAPDS | |

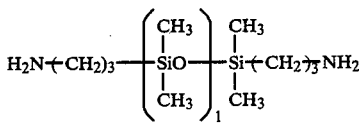

| ODA | oxydianiline |
|---|---|
| BPADA | bisphenol-A-dianhydride |
| GAPPS-9 | |

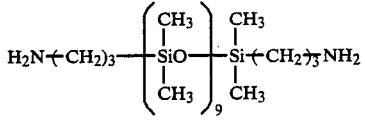

| PMDA | pyromellitic dianhydride |
|---|---|

EXAMPLE 1a

To a 100 ml round bottom flask there was added 2.60 grams of BPADA (0.005 mole) and 25 ml anhydrous N-methyl pyrrolidone (NMP). After the BPADA was dissolved, 1.24 grams SDA (0.005 mole) was added at room temperature. The reaction was continued under vigorous stirring at room temperature for 24 hours. A soluble polyamide acid solution was obtained.

EXAMPLE 1b

The procedure set forth in example 1a was repeated except there was utilized as reactants 5.20 grams BPADA (0.01 mole) and 1.22 grams TDA (0.01 mole) in 20 ml anhydrous NMP. After 24 hours reaction at room temperature a soluble polyamide acid was obtained.

EXAMPLE 1c

The procedure set forth in example 1a was repeated except there was utilized as reactants 2.60 grams BPADA (0.005 mole) and 0.99 grams MDA (0.005 mole) in 20 ml anhydrous NMP. There was obtained a soluble polyamide acid after reaction at room temperature for 24 hours.

EXAMPLE 1d

The procedure set forth in example 1a was repeated except there was utilized as reactants 6.24 grams BPADA (0.012 mole) and 2.49 grams ODA (0.012 mole) in 30 ml anhydrous NMP. After reaction at room temperature for 24 hours there was obtained a soluble polyamide acid.

EXAMPLE 2a

To a round bottom flask there was added 6.44 grams BTDA (0.02 mole) and 27 grams anhydrous NMP. After the BTDA was dissolved, 3.66 grams TDA (0.03 mole) was added to the solution at room temperature. In a separate flask, 6.44 grams BTDA (0.02 mole) was reacted with 8.40 grams GAPPS-9 (0.01 mole) in 34 grams anhydrous NMP. These two solutions were allowed to react for 16 hours at which time they were combined and allowed to react at room temperature for an additional 48 hours to provide a homogeneous polyamide acid solution.

EXAMPLE 2b

To a round bottom flask there was added 5.43 grams PMDA (0.02 mole), 4.00 grams ODA (0.02 mole) and 55 ml anhydrous NMP. Reaction was effected at room temperature for two hours, at which time 8.40 grams GAPPS-9 (0.01 mole) was added to the solution. Reaction was continued for an additonal 48 hours to obtain a soluble polyamide acid solution.

EXAMPLE 3a

To a 100 ml round bottom flask there was added 7.28 grams BPADA (0.014 mole), 3.48 grams GAPDS (0.014 mole) and 30 ml anhydrous NMP. Reaction was effected at room temperature for 24 hours to provide a polyamide acid solution.

EXAMPLE 3b

To a 100 ml round bottom flask there was added 7.80 grams BPADA (0.015 mole), 1.22 grams TDA (0.01 mole) and 40 mole anhydrous NMP. After three minutes vigorous stirring at room temperature, 4.20 grams GAPPS-9 (0.005 mole) was added. The reaction was continued for 24 hours to provide a soluble polyamide acid solution.

EXAMPLE 3c

To a 100 ml round bottom flask there was added 10.4 grams BPADA (0.02 moles), 17.64 grams GAPPS-9 (0.021 mole) and 60 ml NMP. In a separate flask 4.68 grams BPADA (0.009 mole) and 1.586 grams MDA (0.008 mole) were added to 20 ml anhydrous NMP. These two solutions were then allowed to react for 24 hours at room temperature at which time they were combined and allowed to react for another 48 hours at room temperature to provide a polyamide acid solution.

EXAMPLE 3d

To a 100 ml round bottom flask there was added 16.12 grams BPADA (0.031 mole), 6.0 grams ODA (0.03 mole) in 80 grams methyl ethyl ketone (MEK), and 35 grams anhydrous NMP. To another 100 ml round bottom flask was added 10.4 grams BPADA (0.02 mole), 4.97 grams GAPDS (0.021 mole) in 40 grams MEK, and 15 ml anhydrous NMP. These two solutions were mixed together after four hours of reaction and the reaction was then allowed to continue for another 16 hours to obtain a homogeneous polyamide acid solution.

EXAMPLE 4a

To a 100 ml round bottom there was added 10.4 grams BPADA (0.02 mole), 17.64 grams GAPPS-9

(0.021 mole) and 60 ml anhydrous NMP. To a separate 100 ml round bottom flask there was added 4,188 grams BTDA (0.013 mole), 1.466 grams TDA (0.012 mole) and 25 mo anhydrous NMP. Each of these solutions was allowed to react for 24 hours at which time they were mixed together and allowed to react an additional 48 hours so as to obtain a soluble polyamide acid.

EXAMPLE 5

The above solutions were cast in a 0.070×4×4 inch Teflon ® mold and imidization effected by heating in a forced air oven at about 125° C. for 20 hours and thereafter in another forced air oven at about 250° C. for 45 minutes. Samples of each were tested for tensile strength by standard methods using a crosshead speed of 20 inches per minute. The results are set forth in Table I.

EXAMPLE 6

Small pieces of the cast films employed for tensile strength measurements were then placed in five to twenty times their weight diglyme and heated at 90° C. for about 15 minutes. The diglyme solubility test results are also set forth in Table 1.

TABLE 1

| Example | Block Structure | Diglyme Solubility | Tensile Strength (psi) |
|---|---|---|---|
| 1a | (BPADA-SDA) | No | Too brittle to test |
| 1b | (BPADA-TDA) | No | 3500 |
| 1c | (BPADA-MOA) | No | Too brittle to test |
| 1d | (BPADA-ODA) | No | Too bittle to test |
| 2a | [(BTDA-TOA)$_2$ (BTDA-GAPPS-9)] | No | 4700 |
| 2b | [(PMDA-TOA)$_2$ (PMDA-GAPPS-9)] | No | Too brittle to test |
| 3a | BPADA-GAPDS | Yes | 5350 |
| 3b | [BPADA-TDA)$_2$ (BPADA-GAPPS-9)] | Yes | 4600 |
| 3c | [(BPADA-MDA)$_8$ (BPADA-GAPPS-9)$_{20}$] | Yes | 3500 |
| 3d | [(BPADA-ODA)$_{30}$ (BPADA-GAPPS-9)$_{20}$] | Yes | 6100 |
| 4a | [(BTDA-TDA)$_{12}$ (BPADA-GAPPS-9)$_{20}$] | No | 3350 |

These results illustrate that only when the teachings of the instant disclosure are practiced is there obtained a diglyme soluble polyimide having at least one polymeric block with a low glass transition temperature and at least one polymeric block with a high glass transition temperature.

I claim:
1. An article of manufacture comprising:
 (a) a substrate, having coated thereon,
 (b) a diglyme soluble siloxane-imide copolymer composition having the general formula

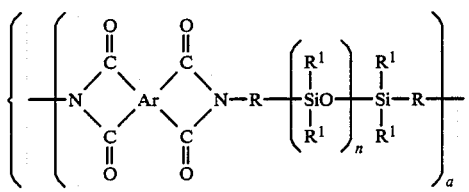

-continued

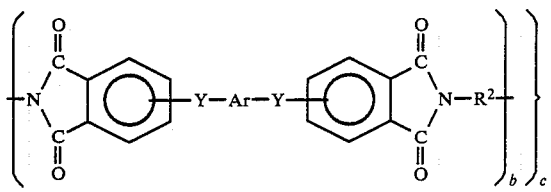

where each Ar is an independently selected aromatic radical; R is a substituted or unsubstituted hydrocarbylene radical or a radical of the formula —Q—Z—R$^3$—, where Q is a substituted or unsubstituted aromatic group, Z is —O—, —S—,

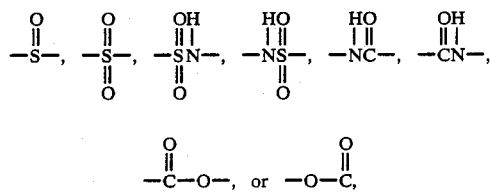

and R$^3$ is a substituted or unsubstituted hydrocarbylene; each R$^1$ is an independently selected substituted or unsubstituted hydrocarbyl radical; R$^2$ is a radical selected from the group consisting of

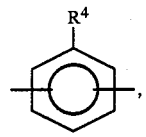

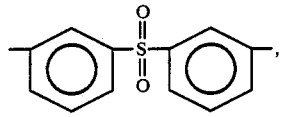

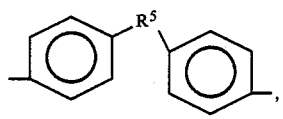

and

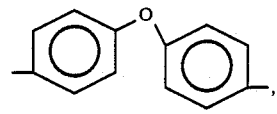

where R$^4$ is an alkyl radical having from 1 to 9 carbon atoms and R$^5$ is an alkyl radical having from 1 to 4 carbon atoms; Y is oxygen or sulfur, and a, b, c and n are all integers equal to or greater than 1.

2. The article of claim 1 wherein said substrate is an electronic device.

3. The composition of claim 1 wherein at least one Ar has a benzene nucleus, naphthalene nucleus or a nucleus of the formula

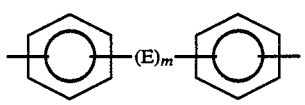

where m is 0 or 1 and E is —O—, —S—,

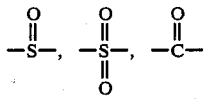

or —C$_y$H$_{2y}$, where y is an integer from 1 to 8.

4. The composition of claim 1 wherein at least one Ar has the formula

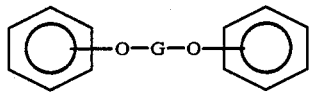

where G is phenylene or a group of the formula

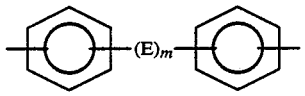

where m is O or 1 and E is —O—, —S—,

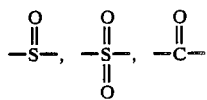

or —C$_y$H$_{2y}$, where y is an integer from 1 to 8.

5. The composition of claim 1 wherein at least one Ar group has the formula

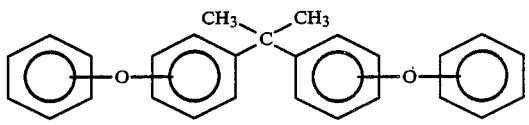

6. The composition of claim 1 wherein R is a lower alkylene radical.

7. The composition of claim 8 wherein R$^1$ is independently selected from methyl, ethyl, propyl, butyl, phenyl, vinyl and 3,3,3-trifluoropropyl radicals.

8. The composition of claim 8 wherein n is an integer from 5 to 100.

9. The composition of claim 8 wherein Y is oxygen.

10. The composition of claim 8 wherein R$^4$ has from 1 to 3 carbon atoms and R$^5$ has 1 or 2 carbon atoms.

11. The composition of claim 8 wherein there is included at least one photosensitive radical.

12. The composition of claim 11 wherein said photosensitive radicals are acrylates, cinnamates 2,3-diphenylcylopropenol esters, or a mixture thereof.

* * * * *

UNITED STATES PATENT AND TRADEMARK OFFICE
CERTIFICATE OF CORRECTION

PATENT NO. : 4,968,757

DATED : November 6, 1990

INVENTOR(S) : Chung J. Lee

It is certified that error appears in the above-identified patent and that said Letters Patent is hereby corrected as shown below:

Column 10, line 54, following "$CH_2 \overset{O}{\frown} CH-R^4-B$" insert --or $O-C=N-R^4-B$--.

Column 16, line 19, claim 7, change "claim 8" to --claim 6--.

Column 16, line 22, claim 8, change "claim 8" to --claim 6--.

Column 16, line 24, claim 9, change "claim 8" to --claim 6--.

Column 16, line 25, claim 10, change "claim 8" to --claim 6--.

Column 16, line 27, claim 11, change "claim 8" to --claim 6--.

Signed and Sealed this

Twenty-seventh Day of October, 1992

*Attest:*

DOUGLAS B. COMER

*Attesting Officer*  *Acting Commissioner of Patents and Trademarks*